United States Patent [19]

Hsu

[11] Patent Number: 5,462,817
[45] Date of Patent: Oct. 31, 1995

[54] RADIANT THERMAL INTEGRATION WITH REGENERATIVE HEATING IN A HIGH TEMPERATURE ELECTROCHEMICAL CONVERTER

[76] Inventor: Michael S. Hsu, Roundhill Rd., Lincoln, Mass. 01773

[21] Appl. No.: 157,749

[22] Filed: Nov. 24, 1993

Related U.S. Application Data

[63] Continuation-in-part of Ser. No. 981,200, Nov. 25, 1992, abandoned.

[51] Int. Cl.$^6$ ..................................................... H01M 8/06
[52] U.S. Cl. ........................... 429/19; 429/20; 429/26; 429/30; 429/32; 429/34; 204/256; 204/258; 204/262; 204/279
[58] Field of Search ..................... 204/256, 258, 204/262, 279; 429/30, 31, 32, 34, 26, 19, 20

[56] References Cited

U.S. PATENT DOCUMENTS

| | | | |
|---|---|---|---|
| 3,394,032 | 7/1968 | Danner . | |
| 3,432,353 | 3/1969 | von Krusenstierna et al. | 136/86 |
| 3,460,991 | 8/1969 | White | 136/86 |
| 3,505,114 | 4/1970 | Rohr | 136/86 |
| 3,526,548 | 9/1970 | Accorsi et al. | 136/86 |
| 3,526,549 | 9/1970 | Archer et al. | 136/86 |
| 3,554,808 | 1/1971 | Fischer et al. | 136/86 |
| 3,607,427 | 9/1971 | White | 136/86 |
| 3,616,334 | 10/1971 | Aker et al. | 204/129 |
| 3,964,930 | 6/1976 | Reiser | 136/86 R |
| 4,042,483 | 8/1977 | Bouy et al. | 204/290 F |
| 4,056,452 | 11/1977 | Campbell | 204/258 |
| 4,085,016 | 4/1978 | Janjua et al. | 204/104 |
| 4,087,976 | 5/1978 | Morrow, Jr. et al. | 60/643 |
| 4,197,362 | 4/1980 | Schmidberger et al. | 429/12 |
| 4,210,512 | 7/1980 | Lawrance et al. | 204/257 |
| 4,310,605 | 1/1982 | Early et al. | 429/18 |
| 4,478,918 | 10/1984 | Ueno et al. | 429/38 |
| 4,482,440 | 11/1984 | Kadija | 204/105 |
| 4,490,444 | 12/1984 | Isenberg | 429/31 |
| 4,490,445 | 12/1984 | Hsu | 429/32 |

(List continued on next page.)

FOREIGN PATENT DOCUMENTS

| | | |
|---|---|---|
| 9309572 | 5/1993 | European Pat. Off. . |
| 63-133461 | 6/1988 | Japan . |
| 1-320773 | 12/1989 | Japan . |
| 3276575 | 6/1991 | Japan . |
| 4144069 | 5/1992 | Japan . |
| WO86/06762 | 6/1986 | WIPO . |

OTHER PUBLICATIONS

Krumpelt H. et al., "Systems Analyses for High-Temperature Fuel Cells", Abstract No. 178, *1046b Extended Abstracts, Fall Meeting, Honolulu, Hi*, p. 261 (Oct. 1987).
Westinghouse Electric Corp., Annual Report Covering the Period Apr. 1, 1978 to Mar. 31, 1979, Apr. 30, 1979. *Thin Film Fuel Cell/Battery Power Generating System*, pp. 3–5.
Argonne National Laboratory, *Advanced Fuel Cell Development Progress Report for Apr.–Jun. 1983*.

*Primary Examiner*—Stephen Kalafut
*Assistant Examiner*—M. Nuzzolillo
*Attorney, Agent, or Firm*—Thomas J. Engellenner; Anthony A. Laurentano; Lahive & Cockfield

[57] ABSTRACT

A high temperature electrochemical converter provides regenerative heating of electrochemical converter reactants to an operating temperature using an exhaust flow. Additionally, a radiant thermal integration configuration transfers heat from an electrochemical converter assembly to power a bottoming plant, thereby achieving flexible and efficient system design. In a fuel cell operating mode, for example, it facilitates the recovery of waste heat of the fuel cell reaction for integration with bottoming thermodynamic devices, such as a gas or steam turbine. The radiant thermal integration is accomplished by efficient radiative heat transfer between the external columnar surface of the converter assembly and the heat transfer assembly containing the working medium of a heat sink or a heat source device, and by a regenerative process where incoming reactants are heated to the converter operating temperature by outgoing exhaust.

17 Claims, 8 Drawing Sheets

U.S. PATENT DOCUMENTS

| | | | |
|---|---|---|---|
| 4,574,112 | 3/1986 | Breault et al. | 429/26 |
| 4,583,583 | 4/1986 | Wittel | 165/46 |
| 4,623,596 | 11/1986 | Kamoshita | 429/26 |
| 4,629,537 | 12/1986 | Hsu | 204/15 |
| 4,644,751 | 2/1987 | Hsu | 60/676 |
| 4,721,556 | 6/1988 | Hsu | 204/258 |
| 4,853,100 | 8/1989 | Hsu | 204/256 |

RADIANT THERMAL INTEGRATION WITH REGENERATIVE HEATING IN A HIGH TEMPERATURE ELECTROCHEMICAL CONVERTER

REFERENCE TO RELATED APPLICATIONS

This application is a continuation-in-part of U.S. application Ser. No. 981,200, filed Nov. 25, 1992, now abandoned.

BACKGROUND OF THE INVENTION

This invention relates to high temperature electrochemical converters and specifically to high performance systems employing such devices and methods.

Electrochemical converters perform fuel-to-electricity conversions in a fuel cell (electric generator) mode or electricity-to-fuel conversions in an electrolyzer (fuel synthesizer) mode. The converters are capable of high efficiencies, depending only on the relation between the free energy and enthalpy of the electrochemical reaction, and are not limited by Carnot-cycle considerations.

The key components in an electrochemical energy converter are a series of electrolyte units onto which electrodes are applied and a similar series of interconnectors disposed between the electrolyte units to provide serial electrical connections. Each electrolyte unit is an ionic conductor having low ionic resistance thereby allowing the transport of an ionic species from one electrode-electrolyte interface to the opposite electrode-electrolyte interface under the operating conditions of the converter. Various electrolytes can be used in such converters. For example, zirconia stabilized with such compounds as magnesia, calcia or yttria can satisfy these requirements when operating at an elevated temperature (typically around 1000° C.). The electrolyte material utilizes oxygen ions to carry electrical current. The electrolyte should not be conductive to electrons which can cause a short-circuit of the converter. On the other hand, the interconnector must be a good electronic conductor. The interaction of the reacting gas, electrode and electrolyte occurs at the electrode-electrolyte interface which requires the electrodes be sufficiently porous to admit the reacting gas species and to permit exit of product species.

The approach of forming electrolyte and interconnector components as free-standing plates was disclosed by the present inventor in U.S. Pat. No. 4,490,445, issued Dec. 25, 1984, which is herein incorporated by reference. However, during operation, the stacks of electrolyte and interconnector plates can experience thermal non-equilibrium. Thus, it is important to reduce thermal gradients across the entire converter assembly by facilitating the transfer of heat to and from the electrolyte elements.

When an electrochemical converter performs fuel-to-electricity conversion in a fuel cell mode, waste energy in the form of heat must be removed from the electrolyte surfaces. Conversely, when the converter performs electricity-to fuel conversion in the electrolyzer mode, the electrolyte must be provided with heat to maintain its reaction. In prior systems, heat exchanging has been achieved primarily by the convective heat transfer capabilities of the gaseous reactants as they travel through the assembly. Such reliance on the heat capacity of the reactants creates an inherent thermal gradient in the system, resulting in non-optimum electrochemical processes.

To rectify this problem, the approach of integrating with the electrochemical converter a series of heat transfer elements was disclosed by the present inventor in U.S. Pat. No. 4,853,100, issued Aug. 1, 1989, which is herein incorporated by reference. The above-mentioned integration system facilitates the heat transfer from the fuel cell stacks by reducing thermal gradients across the converter assembly. However, there still exists a need for further improvements in the thermal control mechanisms within electrochemical energy systems. In particular, an improved electrochemical energy conversion system having the ability to more efficiently regulate the operating temperature within the electrochemical assembly would represent a major improvement in the industry.

SUMMARY OF THE INVENTION

Highly effective thermal control in electrochemical energy conversion systems can be achieved by the bulk integration of columnar electrochemical converter elements and heat transfer elements. The heat transfer elements are disposed between the columnar converter elements to form an integrated inter-columnar array. Radiant heat transfer provides the heat exchange between the converter columns and the heat transfer elements.

System integration, flexibility and efficiency are important aspects of fuel cell design and configuration. Several approaches for integrating a fuel cell system with a bottoming plant, e.g., a steam or gas turbine, are possible. According to one aspect of the invention, a planar composite cylindrical stack with internal manifolding allows efficient thermal integration with power systems, particularly in an internal heat exchanging approach that utilizes Radiant Thermal Integration (RTI). More specifically, the incoming electrochemical converter reactants are heated to a selected operating temperature and then passed through the fuel cell stack. The outgoing exhaust will have been heated to a high outgoing temperature. The exhaust is then passed through a heat exchanger assembly where the exhaust and incoming reactants pass therethrough, thereby conductively transferring heat from the exhaust flow to the incoming gases. The amount of energy transferred from the exhaust to the incoming gases is equivalent to the amount of heat absorbed, creating a thermal balance. Furthermore, there is efficient radiant heat transfer from the columnar stacks to the inter-digitally integrated heat transfer elements, e.g., internal heat exchanging, which contains the working medium for the bottoming cycle. The working medium thereafter removes the heat from the heat transfer elements and conveys it to the bottoming cycle to power the bottoming plant. The high temperature fuel cell stacks can be packaged to form modules, columnar-shaped building blocks of 10–25 kW capacity. The modules can be integrated in parallel bundles to achieve scale-up for MW-level applications.

The electrochemical converter elements of the system can be formed from thin structural components designed to optimize conversion efficiency. Preferably, thin plates of the electrolytes and interconnectors are used. Plasma-spray techniques can be used to produce straight, free-standing, thin electrolyte plates, as described in more detail in U.S. Pat. No. 4,721,556, issued to the present applicant, and which is herein incorporated by reference. Alternatively, wafer processing techniques, as described below, can be employed to construct the electrolyte plates.

Interconnector plates with corrugated patterns, providing passages for the distribution of reactants, can form the other component of the converter stacks. The plates preferably are fabricated from materials that optimize weight and cost requirements. Ease of manufacturing, together with high strength and good chemical resistance at high temperatures, characterize the preferred interconnector materials. Metallic alloy sheets of about 100 to 500 microns have been found suitable. Suitable alloys include nickel alloys, nickel-chromium alloys, nickel-chromium-iron alloys, iron-chromium-aluminum alloys, and cermets of such alloys and refractory compounds, such as alumina or zirconia.

To assure the electrical continuity of the interconnector in high temperature oxidizing environments, thin coatings (i.e., 10 microns or less) of gold, silver or platinum are preferred on the contact points when metallic alloys are used. High temperature and long duration tests have demonstrated the durability and stability of such contact coatings. Stamping or deposition techniques can be employed to form the corrugated patterns of the interconnector plates.

The electrochemical converter stacks can be paired to form hairpin pendants with U-bend connectors to achieve better structural rigidity and more convenient one-sided terminations for gas manifolding and electrical connections. Bus bars are provided to tap or supply electricity to the electrochemical pendants in multiple parallel connections. A counterflow heat exchanger can also be provided to serve as a thermal conduction buffer and preheat incoming gasses in a counterflow scheme.

The energy systems disclosed herein can be used in various systems to generate electricity in conjunction with other thermodynamic processes. In one illustrated embodiment, fuel cells can be employed in a co-generation system to generate electricity within a modified industrial steam boiler.

The heat transfer elements of the present invention can be heat pipes or other tubular structures which are constructed to provide an exceptional degree of heat transport capability. Such tubular structures are preferably adapted to transport the working medium, and can comprise a double lumen or coaxial tube that includes an inner passageway and an outer passageway, the outer passageway having a closed end such that the working flows through the inner passageway to its open end and then back through the outer passageway, or vice-versa.

The invention will next be described in connection with certain preferred embodiments. However, it should be clear that various changes and modifications can be made by those skilled in the art without departing from the spirit or scope of the invention. For example, various configurations of converters and heat transfer elements can be employed to achieved bulk integration. Moreover, although the converter stacks and heat transfer elements are shown in a schematic round, columnar configurations, such components can also take various other forms. Additionally, other materials which have good ionic transport properties can be used in lieu of zirconia to form the electrolyte plates and the patterns formed in interconnector plates can be continuous ridges or discontinuous protrusions. Further, the heat transfer elements can be coaxial tubes or pipes arranged in a parallel configuration.

DETAILED DESCRIPTION

Figure 1:
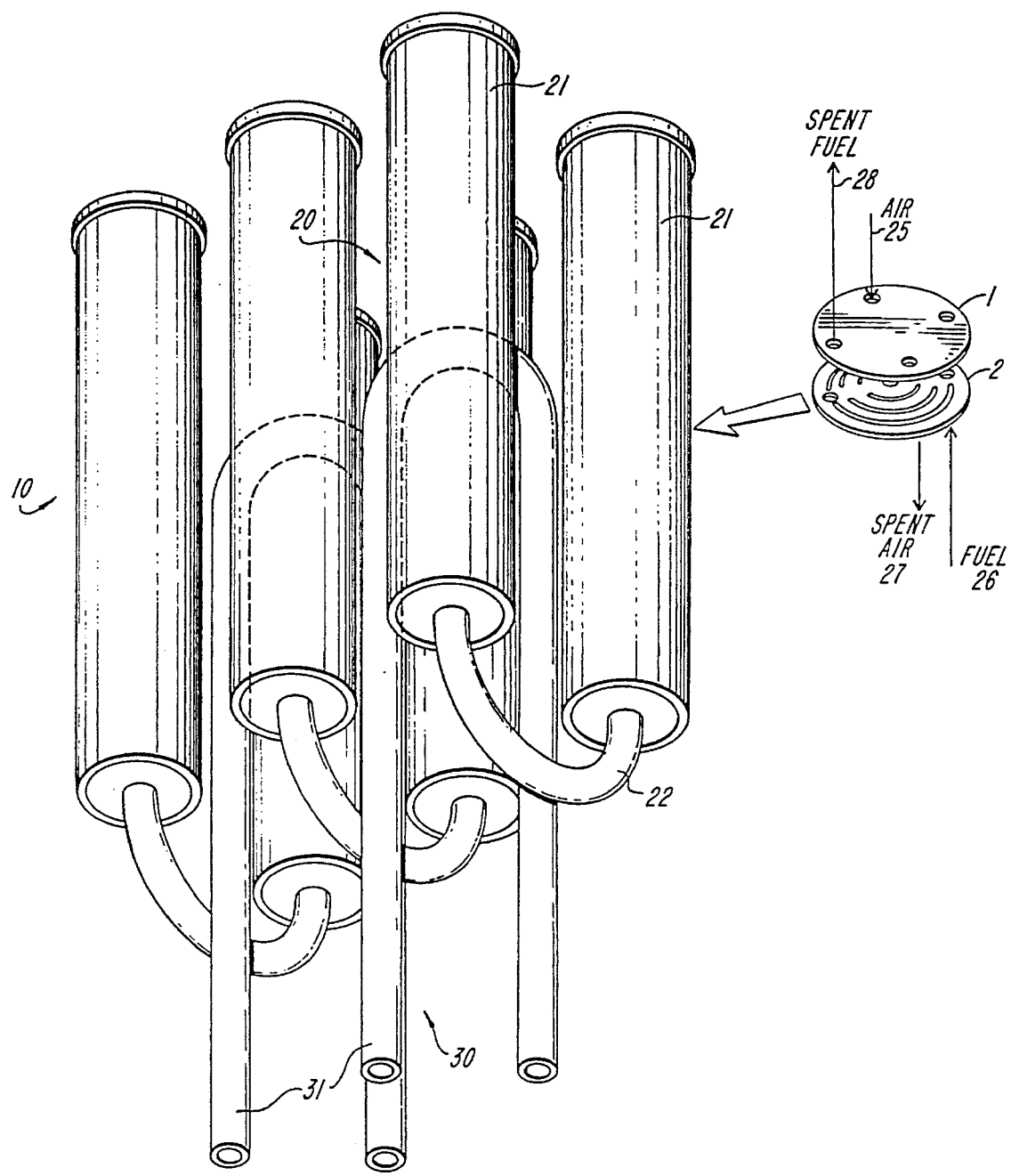
FIG. 1 is a simplified isometric view of an electrochemical energy system employing columnar electrochemical converter elements and heat transport elements according to the invention.

In FIG. 1, an electrochemical energy conversion system 10, according to the present invention, is shown consisting of an electrochemical converter assembly 20 and a heat transfer unit 30. The converter assembly 20 is formed by columnar elements 21 joined by U-bend connectors 22. The columnar elements consist of alternating electrolyte plates 1 and interconnector plates 2. Holes through the plates 1 and 2 form the passages for fuel and oxidizer gases. Grooves in the interconnector plates 2 facilitate the distribution and collection of the gases.

The heat transfer unit 30 serves to facilitate the removal or addition of thermal energy to the converter elements 21. The bulk integration of converter elements 21 and heat transport elements 31 is achieved by alternating the elements 21 and 31 in an interdigitated array, as described in more detail below. The heat transfer between the elements 21 and 31 primarily relies upon thermal radiation. This radiative thermal coupling is capable of high heat flux, and offers mechanical decoupling, thereby relaxing constraints in design and material selections of the heat transport elements. Additionally, the array pattern of a bulk integration provides better temperature uniformity among the electrochemical converters resulting in optimal system performance.

During heat dissipating operations, water, vapor or gas can be carried in elements 31. Heat transfer from the converter elements 21 to the heat transport elements 31 primarily relies upon thermal radiation from the converters 21. The converter stack temperature can be optimally regulated by the selection of the ratio of the stack external surface to the external surface of elements 31, which serve as heat sinks.

The advantages of this radiation-coupled cooling approach are as follows: (1) the fuel cell assembly and the coolant circuit are constructed independently and can be separately serviced; (2) reactant flow requirements can be determined solely on the fuel cell performance rather than cooling needs; (3) steam is generated directly, and the temperature can be easily selected by changing the pressure setting in the boiler; and (4) radiation heat transfer helps to maintain a uniform temperature distribution over cell stack. In various applications, the heat transfer fluid can be water, saturated steam, superheated steam, gas, or a variety of two-phase fluids.

Figure 2:
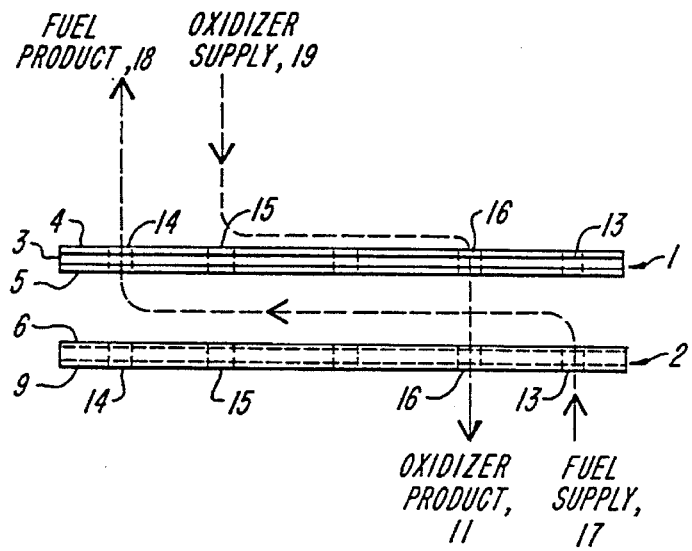
FIG. 2 is an expanded view of an electrolyte component and an interconnector component of an individual converter element of FIG. 1.
Figure 3:
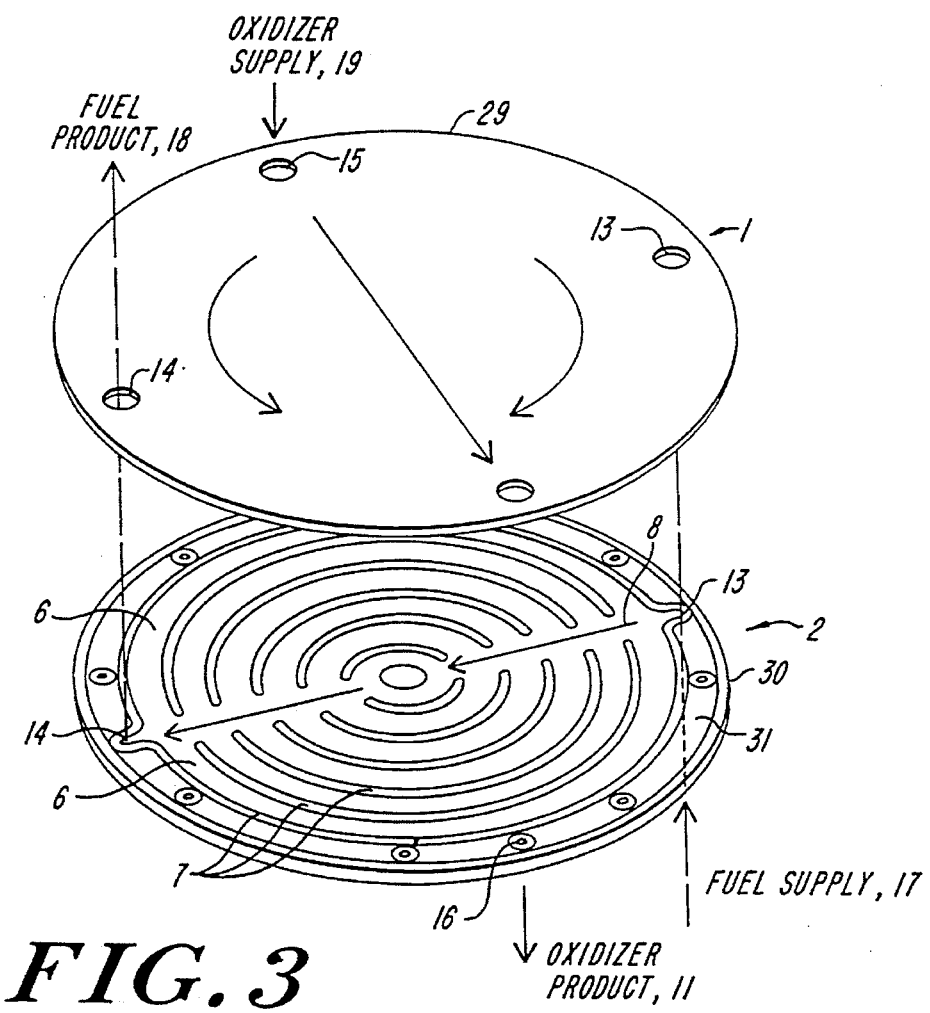
FIG. 3 is an isometric view of the electrolyte and interconnector components of FIG. 2.

In FIGS. 2 and 3, the basic cell unit in the electrochemical cell stack is shown comprising a single electrolyte plate 1, and a single interconnector plate 2. In one embodiment, the electrolyte plate 1 can be made of stabilized zirconia $ZrO_2(Y_2O_3)$ material 3, on which a porous oxidizer electrode 4 and a porous fuel electrode 5 are coated. Exemplary materials for the oxidizer electrodes are perovskites such as $LaMnO_3(Sr)$. Preferred materials for fuel electrodes are cermets such as $ZrO_2/Ni$. The interconnector plate 2 preferably is made of a metal such as Inconel, a nickel alloy or a platinum alloy or made of a non-metallic conductor, such as silicon carbide. The interconnector plate 2 serves as the electric connector between adjacent electrolyte plates and as a partition between the fuel and oxidizer gases as well as providing a heat conduction path along the electrode surfaces 4, 5 and to the outer edges of the plates 1 and 2.

Fuel can be supplied to the cell stack through an axial (with respect to the stack) manifold 17 coupled to the stack via holes 13 and the fuel product is exhausted through manifold 18 via holes 14. The fuel is distributed over the fuel electrode surface 5 through passageway means illustrated as an in-plane groove network 6 formed in the upper surface of the interconnector plate 2. The notches 8 made in ridges 7 provide openings into the groove network 6 connecting holes 13 and 14 at the surface of each fuel electrode 5. The oxidizer is fed to the stack from manifold 19 via holes 15 and its product is exhausted through manifold 20 via holes 16. The oxidizer is distributed over the oxidizer electrode surface of the next electrolyte plate through a complementary in-plane groove network 9 formed in the lower surface of the conductor plate 2. A similar network on the lower surface of the adjacent cell above provides the passages for the oxidizer along electrolyte plate 1 as shown in FIG. 3. The outer ridges of the groove networks 6 and 9 on the interconnector plates 2 are brought in contact with electrolyte plates 1 to form the sealed outer walls of the stack assembly. The ridges 7 are pressed against the electrodes in the assembly to achieve electrical contacts. The stack can be secured by tension rods (not shown) or sealed.

It is to be understood that the apparatus related to this invention can be utilized as a fuel cell (electric generator) when gaseous fuel is supplied to the converter or can be utilized as an electrolyzer (fuel synthesizer) when electricity is applied.

The thin electrolyte plates of this invention can be prepared using a high energy plasma-spray technique as disclosed in U.S. Pat. No. 4,629,537, to the present inventor, and which is herein incorporated by sequence. Alternatively, electrolyte plates can be produced from slices of bulk electrolyte materials. For example, a high density cylindrical block of a solid oxide material (e.g., zirconia with yttria doping) can be formed by slip casting, followed by a slow sintering cycle to yield a dimensionally-stable, stress-free block. A thin electrolyte plate or membrane can then be obtained by precision slicing of the block.

Other materials can also be substituted for solid oxide in the fabrication of electrolyte plates. Such materials include solid state anion conductors and solid state proton conductors. Additionally, other oxygen ion transporting materials, such as molten carbonate on a solid carrier can also serve as electrolyte plates. These materials may be useful in particular applications where lower operating temperatures (e.g., about 500° C. to about 850° C.) are desired. Furthermore a wide variety of conductive materials can be used for the thin interconnector plates of this invention. The suitable materials for interconnector fabrication include nickel alloys, nickel-chromium alloys, nickel-chromium-iron alloys, iron-chromium-aluminum alloys, platinum alloys, cermets of such alloys and refractory material, such as zirconia or alumina, silicon carbide and molybdenum disilicide.

The corrugated top and bottom patterns of the interconnectors can be obtained, for example, by stamping the metallic alloy sheets with one or more sets of matched male and female dies. The dies are prefabricated according to the desired configuration of the product, and can be hardened by heat treatment to withstand the repetitive compressing actions in mass productions.

Figure 4:
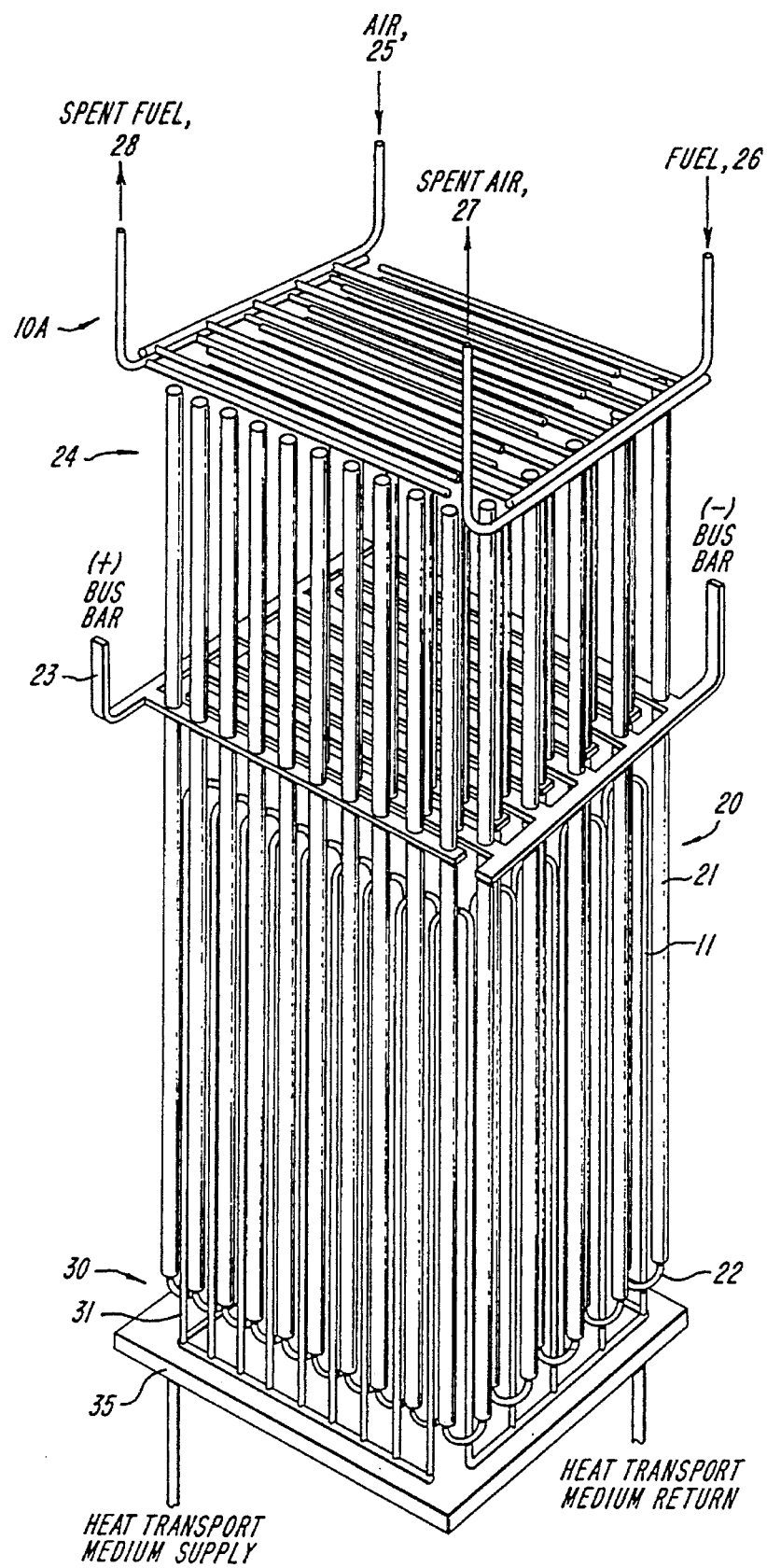
FIG. 4 is a more detailed isometric view of an electrochemical energy system according to the invention.

In FIG. 4, a more comprehensive illustration of the system 10A is shown having stacked electrolyte and interconnector plates as its components. In general, the structures of the electrochemical converter elements are similar to those described in U.S. Pat. No. 4,490,445 cited above and incorporated by reference. The system 10A includes a converter assembly 20 having hairpin pendants 21 with U-bends 22 to achieve better structural rigidity and more convenient one-side terminations for gas manifolding and electrical connections. Bus bars 23 are provided to tap or supply electricity to the electrochemical pendant stacks 21 which are in multiple parallel electrical connection. The system 10A is designed to operate efficiently at an elevated temperature in the range of 800° C. to 1200° C., and optimally at about 1000° C. Heat exchanger stacks 24 are provided and serve as a thermal conduction buffer between the hot electrochemical cell stacks 21 and the incoming gases. In the illustrated embodiment, the incoming reaction gases are heated by the outgoing spent product gases in a regenerative heating mechanism that preferably employs a counterflow scheme.

Preferably, the sensible heat exchange between the incoming and outgoing gases are such that the convective heat exchanged between the gases is equalized. For example, waste heat associated with the spent fuel that would otherwise be transferred out of the system via exhaust flow would be absorbed by the incoming gases. The effect is to continuously recover that selected amount of heat used to heat the reactants and which is carried in the exhaust flow. Maximizing this heat exchange decreases the amount of heat lost by the system, thereby improving the overall system efficiency.

Figure 5:
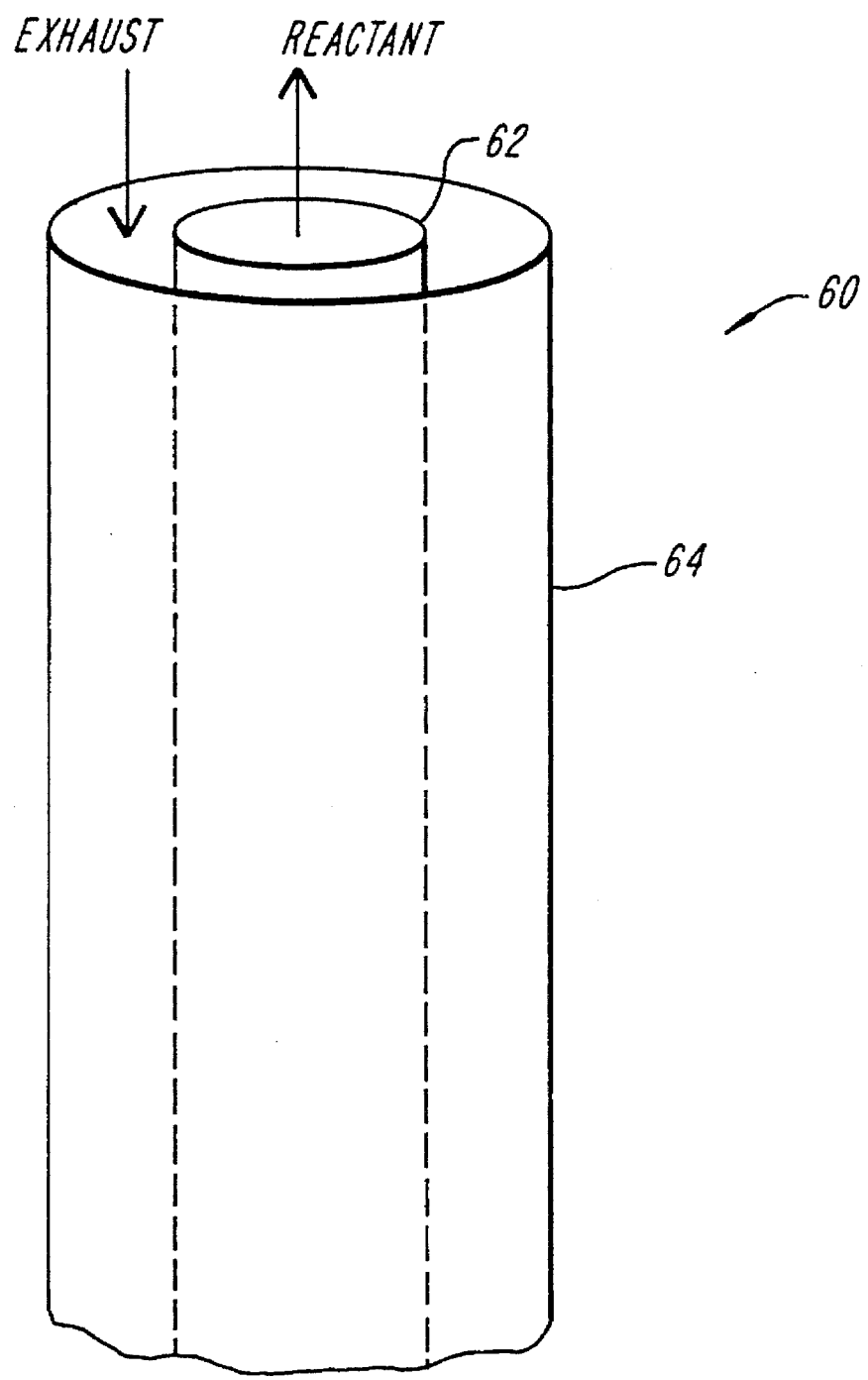
FIG. 5 illustrates a counterflow heat exchanger employed in the regenerative heating process according to the invention.

In a preferred embodiment of the invention, the regenerative heating mechanism can employ a series of coaxial tubes 60, as shown in FIG. 5. The inner tube 62 carries one of the fuel cell reactants, e.g. fuel, while the outer tube 64 transfers exhaust out of the electrochemical converter 20. The reactant enters the input end 66 of the inner tube 62 at an ambient temperature, and the heat associated with the exhaust heats the incoming reactant to a temperature close to the operating temperature of the converter assembly 20. In a particularly preferred embodiment, the regenerative heating mechanism employs a pair of coaxial tubes 60, each carrying a different reactant to the converter assembly 20. Other embodiments can employ a series of parallel tubes, whereby the reactants are again heated in a counterflow scheme by the exhaust. Furthermore, although a pair of coaxial tubes 60 are used, any number of tubes can be employed.

According to a preferred practice of the invention, the regenerative heating mechanism can be an internally or externally integrated counterflow heat exchanger, disposed at the input of the electrochemical converter assembly 20.

Also shown in FIG. 4 is an inter-columnar heat transfer assembly 30 integrated with the converter assembly 20. The heat transfer assembly 30 includes individual heat transfer elements 31 (which carry the working medium of the bottoming cycle) and a manifold 35 which connects the individual elements 31 together. The manifold 35 can be connected to a radiator (not shown) for cooling operations or to a heat source (not shown) to accept heat energy and transfer such energy to the converter assembly 20.

Figure 6A:
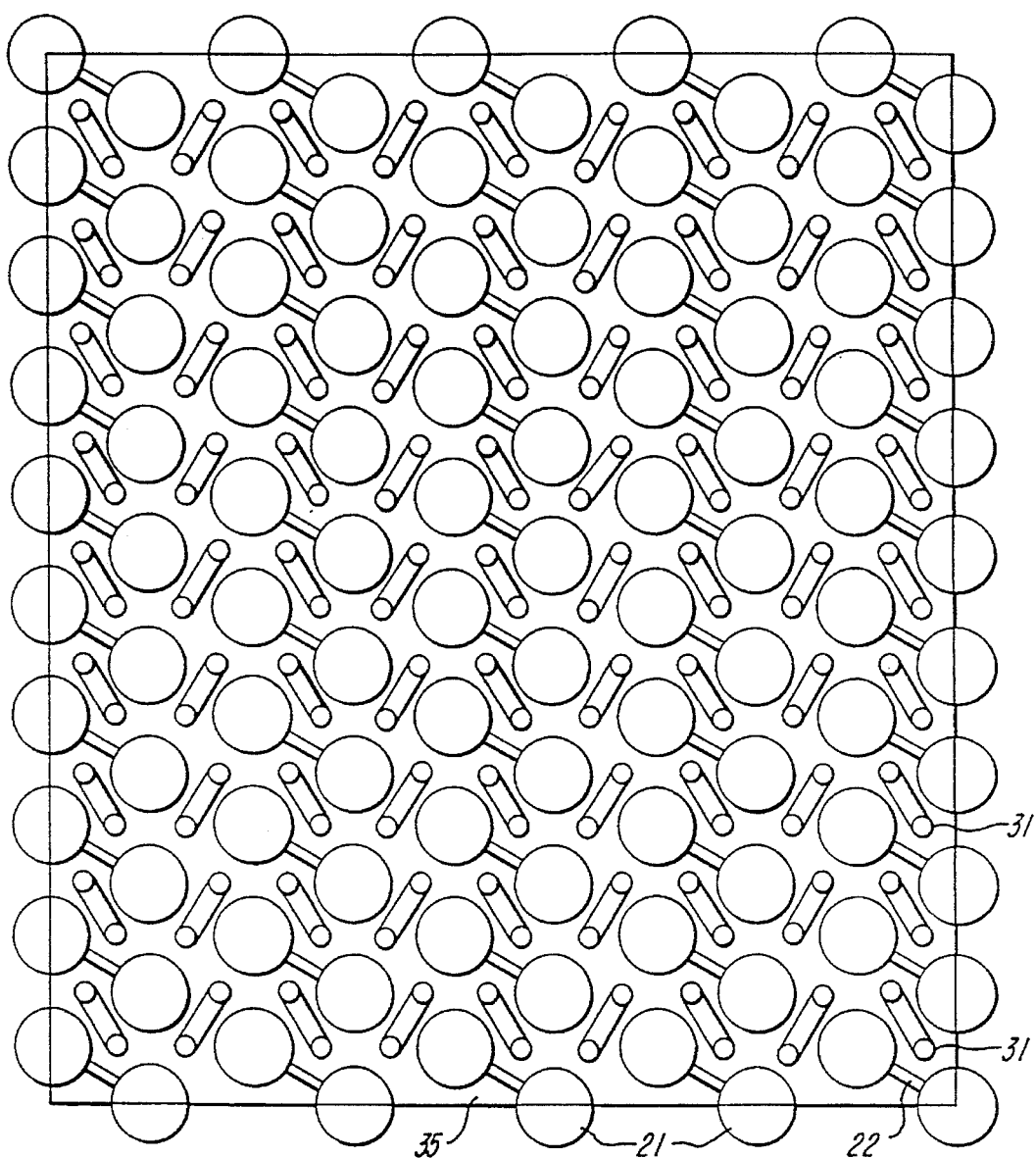
FIG. 6A is a cross-sectional view of the system of FIG. 4 showing the bulk integration of converter and heat transport elements.

FIG. 6A is a cross-sectional illustration of the system 10A of FIG. 4 illustrating the bulk integration of the converter and heat transport assemblies 20, 30. FIG. 6 shows the two-dimensional array of converter elements 21 (joined by U-bend connectors 22) and U-shaped heat transport elements 31.

Figure 6B:
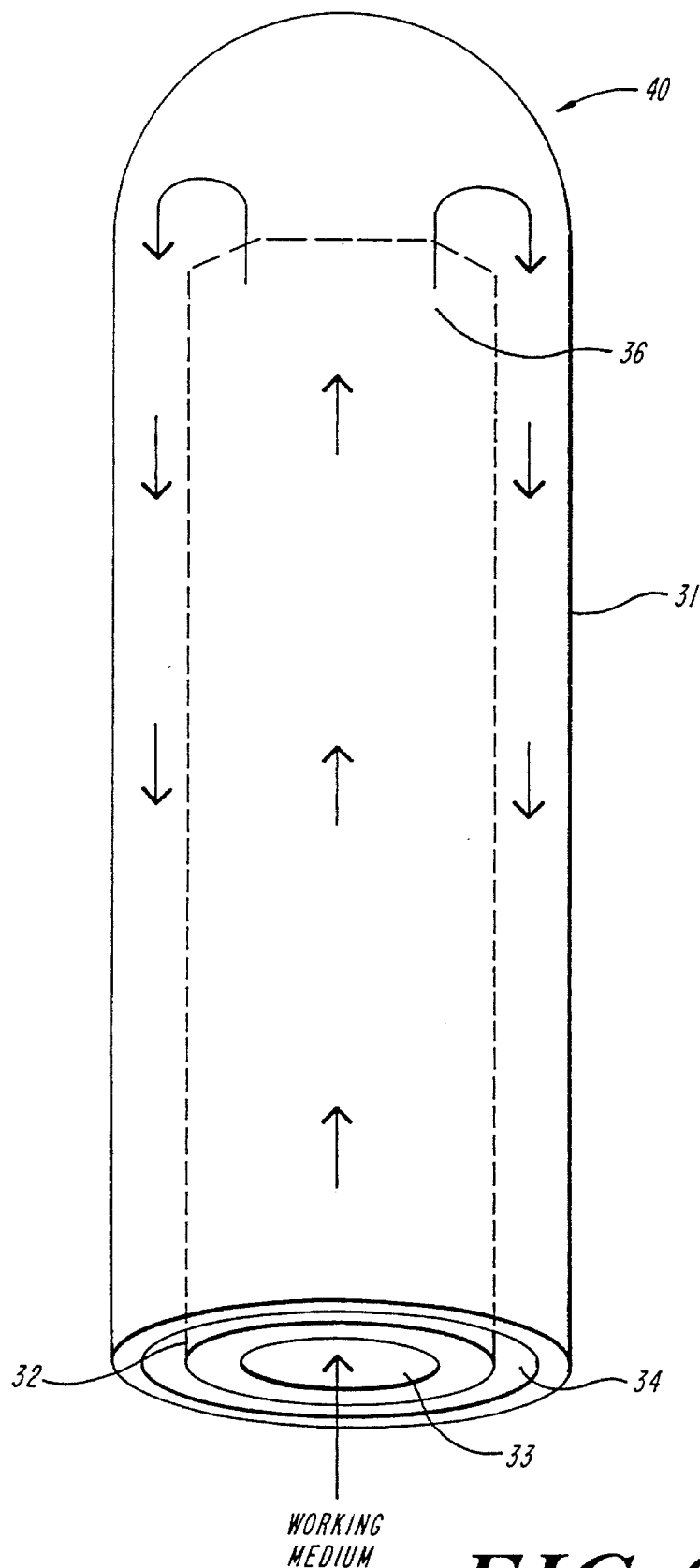
FIG. 6B is an exploded view of the heat transfer element of FIG. 1A showing the flowing scheme of the working medium according to a preferred practice of the invention.

FIG. 6B is an exploded view of the heat transport elements 31 according to a preferred embodiment of the invention. The heat transport elements 31 have coaxially disposed therein a second tube 32. In combination, the two tubes 31 and 32 form an inner passageway 33 and an outer passageway 34. The inner passageway 33 transports the working medium from the bottoming cycle to the converter assembly 20, where heat energy radiated from the assembly 20 is absorbed by the medium. By way of example, the working medium from the bottoming cycle first passes through the inner passageway 33, and then through the outer passageway 34, as shown by the solid arrows. The working medium initially enters the input 35 of the inner passageway 33 at a first temperature, preferably about 20° C. As the medium travels through the inner passageway 33, the converter assembly radiant energy heats the medium. Consequently, the medium exits the inner passageway 33 at the output 36 at a second temperature, preferably about 500° C., that is significantly higher than the first temperature.

The closed end 40 of the element 31 forces the working medium to travel through the outer passageway 34 in a direction opposite to the medium flow in the inner passageway 33. As the medium flows through the outer passageway 34, the energy radiated by the converter assembly 20 further heats the medium to a third temperature, preferably to about 1000° C. or closer to the operating temperature of the converter assembly 20. This double lumen arrangement reduces the thermal gradient that axially develops along the electrochemical converter elements by reducing the occurrence of hot spots on the heat transport elements 31, and thus uneven cooling of the assembly. Consequently, the arrangement reduces thermal stresses that develop along the assembly 20. Although depicted as a coaxial tube with a closed end, the heat transport elements can also comprise parallel running tubes and U-shaped tubes as shown in FIG. 1.

Figure 7:
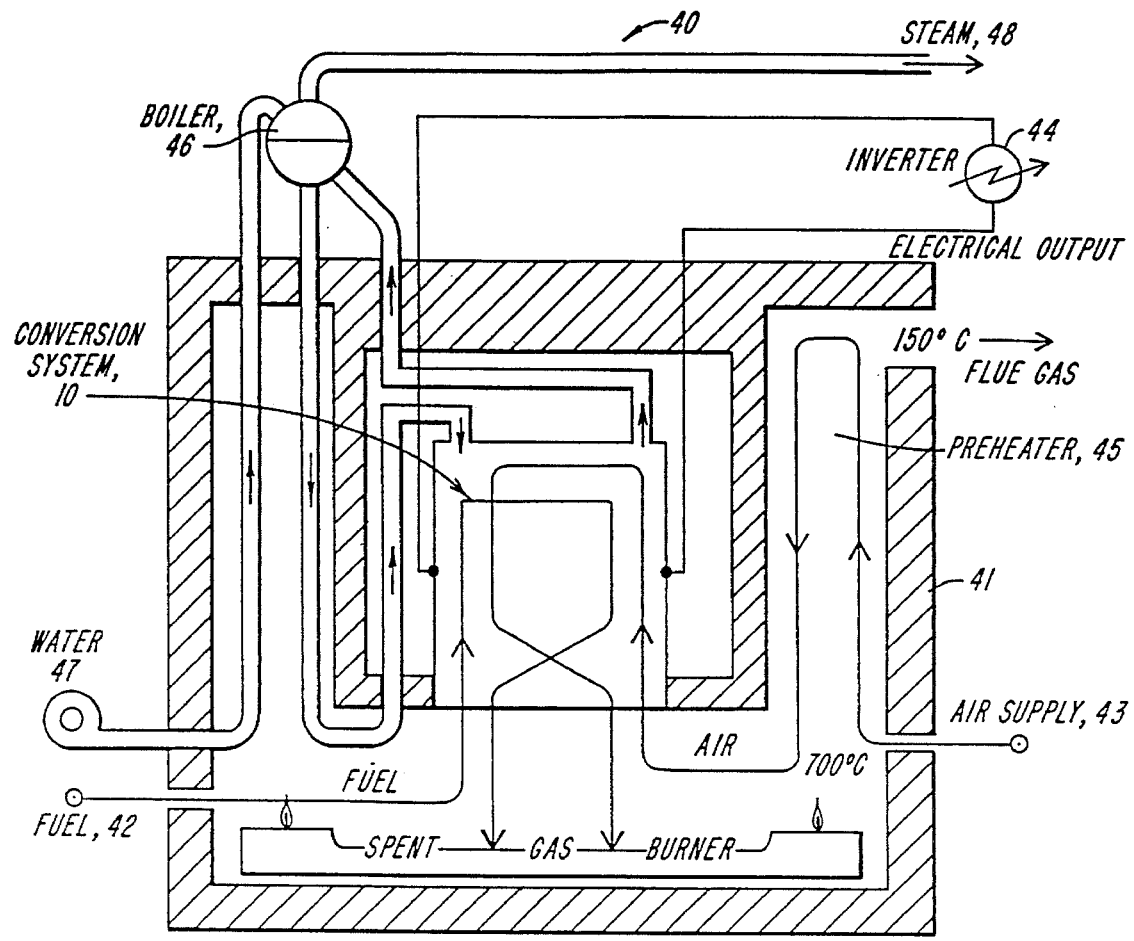
FIG. 7 is a schematic illustration of a co-generation application incorporating the electrochemical energy system of the present invention.

FIG. 7 shows a steam-co-generation system 40 useful, for example, in generating steam for industrial or residential uses, from the heat dissipated from an electrochemical converter 10 within the thermal enclosure chamber 41. In this configuration, fuel supply 42 is first fed via heat exchangers into the converter 10 and air from air supply 43 is likewise fed through the exchangers into the converter 10. The electricity generated by the converter is converted to alternating current electrical output by inverter 44. In this co-generation system 40 the converter produces electricity at about 1000° C. by an exothermic electrochemical process. In this system, the heat is radiantly transferred to the heat transfer assembly 30. Steam is generated in the heat transfer assembly 30 and collected in the boiler drum 46. The spent gases from the converter are also burned within the thermal enclosure 41 to provide additional energy necessary to generate further steam 48 from water 47. This steam can be used directly in industrial applications for various processes or can be used, for example, in residential or commercial applications for heating or the like.

Figure 8:
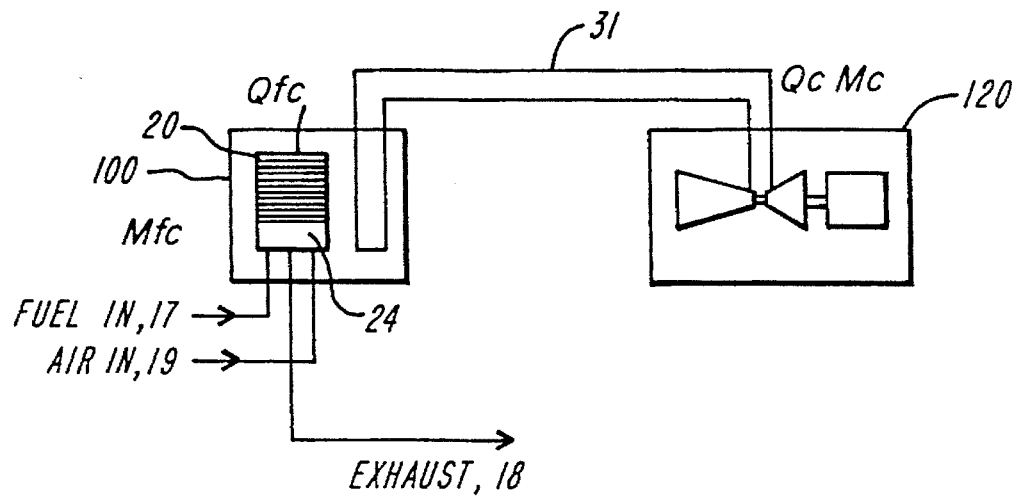
FIG. 8 is a system schematic diagram of the electrochemical energy system integrated with a steam or gas turbine by radiant thermal coupling with a turbine working medium.

FIG. 8 is a schematic illustration of an electrochemical converter heat source 100 integrated with a steam or gas turbine 120 by radiant thermal coupling or by a radiant thermal integration (RTI) technique, as further explained below. The heat source 100 comprises an electrochemical converter assembly 20, heat exchange assembly 24 and heat transfer elements 31. The heat transfer elements 31 radiate heat directly to the bottoming device 120 of the steam turbine. According to a preferred aspect of the invention, the amount of heat supplied to the fuel cell reactants 17, 19 as they are processed is convectively transferred to the incoming reactants 17, 19 through heat exchanger 24. The RTI technique requires the fuel cell 20 to act as a constant temperature radiant heating element which supplies heat to two separate flow loops. Typical parameters that can be included are as follows:

$M_{fc}$ The mass flow rate of the fuel cell loop.

$M_a$ Supplemental air flow rate required to maintain an allowable thermal gradient in the fuel cell stack.

$M_c$ The flow rate of the working medium for the bottoming cycle.

$\Delta T_{fc}$ The temperature rise of the reactants in the fuel cell loop.

$\Delta T_a$ The temperature rise of the supplemental air flow that may be required for certain integration concepts in order to cool the fuel cell stack.

$\Delta T_c$ The temperature rise of the working medium for the bottoming cycle.

$Q_{fc}$ Heat provided from the fuel cell for use by the bottoming cycle.

$Q_c$ Heat recovered by the bottoming cycle.

As mentioned above, one flow loop, the fuel cell loop $M_{fc}$, performs reactant processing, thermal regeneration and fuel cell operation. The fuel cell loop utilizes the regenerative heat exchange mechanism between the inlet and the outlet exhaust streams, as described above, thereby maintaining the temperature difference of the fuel cell loop ($\Delta T_{fc}$) as small as possible. More specifically, the regenerative heat process occurring within the heat exchanger unit 24 optimally recoups the thermal input used to heat the fuel cells reactants and applies this regenerated heat to the incoming reactants 17,19. The dual effect is to heat the incoming reactants and cool the exhaust stream 18, 11. Meanwhile, the system recoups waste heat in the exhaust flow, creating high system efficiency.

The other flow loop, which includes the heat transfer elements 31 and is physically decoupled, contains the working medium $M_c$ for a steam or gas turbine bottoming cycle and can be optimized according to the waste heat removal requirements and bottoming cycle thermodynamic considerations. The mass flow rate of the working medium ($M_c$) is to be regulated to a level which can absorb the radiatively transferred waste heat from the fuel cell stack and achieve a large temperature ($\Delta T_c$) rise which is favorable from a thermodynamic cycle efficiency standpoint. Additionally, the double passageway configuration of the heat transfer elements 31 maximizes the amount of waste heat absorbed by the working medium, thereby increasing system efficiency. This RTI approach results in high system efficiency, a compact physical system since no intermediate external heat exchangers are required (see FIG. 9), and a unified design for integration with either gas or steam bottoming cycle equipment.

The heat transfer elements 31 are located near the bottoming thermodynamic device 120 so as to radiate heat from the heat transfer elements via the working medium located within the heat transfer elements 31, to the steam turbine. Efficient recovery of thermal energy in the form of heat during the regenerative process in the heat exchanger assembly 24, provides additional system waste heat to be removed by the heat transfer elements. In a preferred embodiment of the invention, heat from the fuel cell stacks 20 is radiantly transferred to the inter-digitated heat transfer elements 31. Simultaneously, the working medium located within the heat transfer elements 31 allows the unit to maximize the amount of waste heat captured and subsequently transferred to the system bottoming device 120. Since more heat is captured and used to generate power, the overall system demonstrates high system efficiency.

This RTI approach eliminates from the overall system an intermediate heat exchanger, which typically couples the converter assembly 20 to the bottoming plant 120. Eliminating the intermediate heat exchanger provides design freedom which allows the converter assembly 10A to be located independently of the system turbine device 120.

Figure 9:
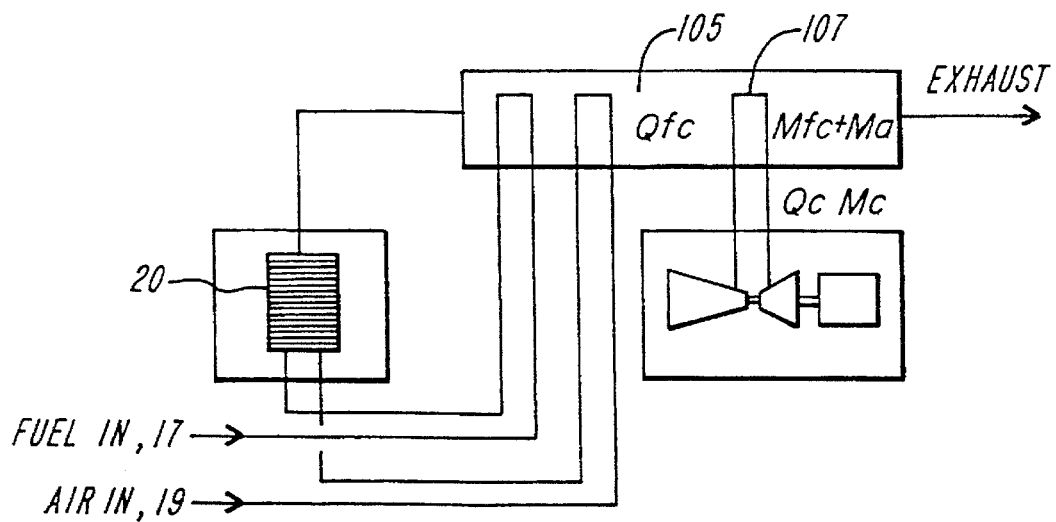
FIG. 9 is a schematic diagram of a prior art fuel cell system integrated with a steam or gas turbine by convective thermal coupling with a working medium via an external intermediate heat exchanger.

In contrast to the highly efficient RTI technique described above, prior systems employ a convective thermal integration approach which is typically used in hybrid system integration. FIG. 9 shows a system diagram of a fuel cell 20 integrated with a steam or gas turbine by convective thermal coupling to the working medium via an external heat exchanger. In this case, the heat recovery for the bottoming cycle is accomplished by convective heat transfer from the intermediate heat exchanger 105. Typically, a supplemental cooling air flow Ma needs to be added to the fuel cell reactants flow Mfc, which in combination (Mfc+Ma merged flow), serves to remove waste energy and to limit the fuel cell temperature rise to a proper level. With this convective approach, the supplemental air flow has to be first heated to a temperature close to the fuel cell operating temperature prior to entering the fuel cell or risk structural degradation of the converter 10.

The allowable temperature rise for the gaseous flow through the fuel cell stack ($\Delta Tfc$) is primarily limited by thermal gradient considerations in the stack. At the exit of the fuel cell, the flow can be regeneratively cooled for energy conservation purposes. After the regenerative processes are satisfied, the gas will emerge as the heat source with a potential to provide a temperature rise of $\Delta Tfc$ to the working medium (Mc) in an intermediate heat exchanger. Considering the practical constraints of size, economics, and temperature differences associated with the design of the required intermediate heat exchanger, the realizable temperature rise of the working medium, $\Delta Tc$, would be much less than the temperature rise of the working medium in the RTI approach, $\Delta Tfc$. This in turn limits the overall system efficiency, and thus the efficiency of the bottoming cycle.

The high temperature fuel cells used in the converter assembly 20 of FIG. 9, are capable of 45–50% efficiency with the selection of practical operation ranges in current density, and fuel utilization. In hybrid systems using the RTI approach, such as shown in FIG. 8, the high temperature fuel cell with a steam or gas turbine can result in an additional 14–16%-point improvement to the stand-alone case, bringing the total overall system efficiency to 61–64%. The improvement in efficiency is derived from the effective recovery of waste heat from the high temperature fuel cell stacks for use with available bottoming cycle equipment (at a typical efficiency of 29%). The suitability of using "off-the-shelf" power plant equipment for bottoming systems simplifies the integration and minimizes any uncertainties associated with efficiency projections. Additionally, the balance of plant operations according to the invention are simplified because the Radiant Thermal Integration feature eliminates the need for intermediate heat exchangers or heat recovery subsystems, as described below.

In contrast, if a convective thermal integration approach was used to integrate the fuel cell with steam bottoming cycles, the efficiencies would be 51–54%, 7–13%-points lower than equivalent system using the radiant thermal integration (RTI) approach. The reduction in performance is primarily due to the limitations imposed by the convective thermal integration approach in recovering heat from the stack. Additionally, as described above, an intermediate heat exchanger would be required thus resulting in additional cost to the system.

The conventional method for fuel cell thermal management has been to force large quantities of a supplemental liquid or excess gaseous coolant stream through the electrochemical convert assembly 20. Since these large flow quantities must be heated to a temperature close to the electrolyte operating temperature (to reduce thermal stress) and must be circulated throughout the assembly 20, a dedicated supplemental coolant processing subsystem is usually employed. This subsystem, depicted as intermediate heat exchanger 105, includes equipment for regenerative heating, pumping, and processing of the supplemental coolant. A subsystem of this type adds substantially to the cost of the overall energy system. Additionally, in order to process the large quantities of supplemental reactant, whose quantity is usually ten times greater than the quantity of reactants employed by the converter assembly 20, a large and cumbersome subsystem is utilized. In contrast, the present invention does not require a dedicated subsystem since no supplemental coolant flow is necessary to remove waste heat from the converter assembly.

Accordingly, what is claimed as new and desired to be secured by Letters Patent is:

1. A high efficiency electrochemical converter system, said system comprising:

an electrochemical converter assembly having a plurality of converter elements disposed in columns, said converter assembly including reactant supply means for supplying reactants to said electrochemical converter assembly, and exhaust means for removing exhaust gases, electricity extraction means for extracting an electrical current from said assembly, regenerative heat exchange means coupled to one end of said converter assembly for heating said reactants prior to introduction to said converter assembly to a selected operating temperature while simultaneously cooling said exhaust to effectuate a balanced thermal energy transfer between said incoming reactants and said outgoing exhaust gases such that the heat energy transferred from said exhaust to said incoming reactants is approximately equal to the heat absorbed by said reactants, and an integrated heat transfer assembly having a plurality of heat transfer elements for transport of a working medium, said heat transfer elements being disposed between said electrochemical converter elements without contacting said converter elements to provide efficient temperature regulation thereof and serving to remove waste heat by radiant heat transfer from said columnar converter elements to said heat transfer elements, said heat transfer assembly being adapted to couple said waste heat to a bottoming thermodynamic device thereby substantially reducing the need for applying a supplemental cooling mass flow through said electrochemical converter elements to remove waste heat therefrom.

2. The electrochemical converter system of claim 1 wherein said bottoming thermodynamic device, connected to said integrated heat transfer assembly, is adapted to convert at least part of said waste heat captured by said working medium in said integrated heat transfer assembly into electrical power.

3. The system of claim 1 wherein said regenerative heat exchange means heats said incoming reactants to a temperature approaching the operating temperature of the electrochemical converter.

4. The system of claim 1 wherein said regenerative heat exchange means is an internally integrated heat exchanger.

5. The system of claim 4 wherein said internally integrated heat exchanger is a counterflow heat exchanger.

6. The system of claim 5 wherein said counterflow heat exchanger comprises a first tube and a second tube, said first and second tubes being substantially parallel to each other.

7. The system of claim 5 wherein said counterflow heat exchanger includes coaxial first and second tubes.

8. The system of claim 3 wherein said regenerative heat exchange means is an externally integrated heat exchanger.

9. The system of claim 8 wherein said externally integrated heat exchanger is a counterflow heat exchanger.

10. The system of claim 9 wherein said counterflow heat exchanger comprises a first tube and a second tube, said first and second tubes being substantially parallel to each other.

11. The system of claim 9 wherein said heat exchanger includes coaxial first and second tubes.

12. The system of claim 1 wherein said bottoming plant comprises one of a gas turbine and a steam turbine.

13. The system of claim 1 wherein said heat transfer elements comprise a first tube and a second tube, said first and second tubes being substantially parallel to each other.

14. The system of claim 1 wherein said heat transfer elements comprise an outer tube and an inner tube being coaxially disposed therein.

15. The system of claim 14 wherein said outer tube of said heat transfer element has a first end and a substantially closed second end.

16. The system of claim 1 wherein said working medium comprises at least one of gas, vapor and water.

17. The system of claim 1 wherein said electrochemical converter and said bottoming plant are configured to be independently pressurized.

* * * * *